United States Patent [19]
Ray

[11] Patent Number: 5,350,230
[45] Date of Patent: Sep. 27, 1994

[54] DOOR LOCKING MECHANISM FOR BATCH MIXERS

[75] Inventor: Timothy L. Ray, Winchester, Va.

[73] Assignee: O'Sullivan Corporation, Winchester, Va.

[21] Appl. No.: 128,204

[22] Filed: Sep. 29, 1993

[51] Int. Cl.$^5$ .......................... B29B 5/00; B01F 15/02
[52] U.S. Cl. ........................... 366/75; 366/76; 425/447; 425/449; 425/593
[58] Field of Search ............... 366/75, 76, 77, 78, 366/79, 83, 84, 85, 96, 97, 150; 425/208, 209, 447, 449, 593

[56] References Cited
U.S. PATENT DOCUMENTS

| | | | |
|---|---|---|---|
| 1,938,377 | 12/1933 | Ducharme et al. | 366/76 |
| 4,298,322 | 11/1981 | Anders | 366/75 |
| 5,061,078 | 10/1991 | Yada | 425/209 |
| 5,108,188 | 4/1992 | Peter | 425/209 |

*Primary Examiner*—Robert W. Jenkins
*Attorney, Agent, or Firm*—Burns, Doane, Swecker & Mathis

[57] ABSTRACT

A batch mixer includes a mixing chamber in which polymeric material such as plastics and rubber is heated and mixed. The material is fed to the mixing chamber through a hopper. The hopper has a door which is swung open and closed by a fluid-actuated cylinder. A locking mechanism is provided to enable the door to be swung only slightly open by excessive pressure build-ups in order to vent the pressure without permitting an appreciable amount of molten material to escape through the door.

11 Claims, 3 Drawing Sheets

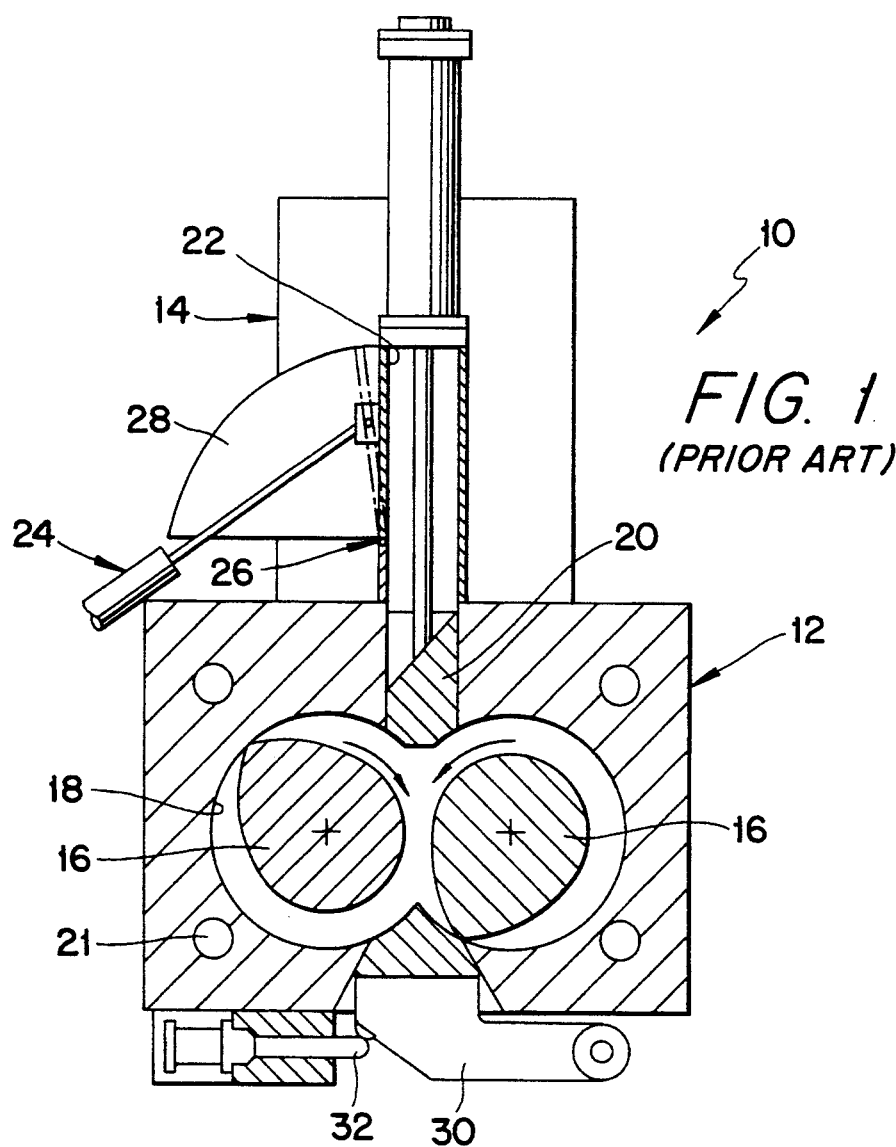
FIG. 1 (PRIOR ART)
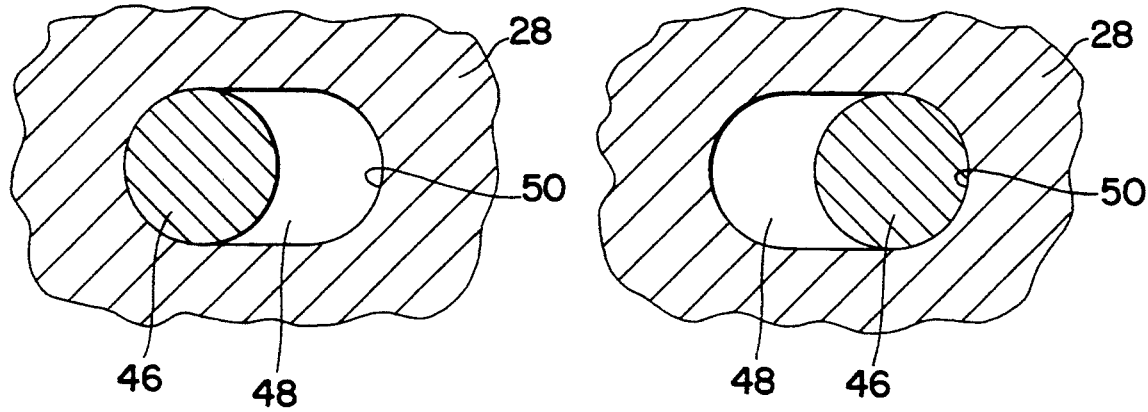
FIG. 4
FIG. 5

DOOR LOCKING MECHANISM FOR BATCH MIXERS

BACKGROUND OF THE INVENTION

The present invention relates to batch mixers which mix polymeric materials such as plastics and rubber and, in particular, to a hopper door-locking mechanism for such mixers.

The mixing of raw materials, such as plastics and rubber, is often performed in batch mixers, such as a so-called "Banbury" mixer described, for example, in U.S. Pat. No. 4,818,113. Such a mixer 10, depicted herein in FIG. 1, includes a mixing body 12 and a feed hopper 14 for supplying the raw material to the mixing body. The mixing is performed by rotors 16 which are rotated at identical or different speeds within a mixing chamber 18 of the mixing body 12. A ram 20 is provided which can be lowered downwardly onto the mix within the mixing chamber to aid in the mixing operation. Heat is supplied to the mixing chamber by circulating hot oil or steam through passages 21 formed in the mixing body 12.

A hopper body of the feed hopper 14 has a door 22 which can be opened to enable raw material to be fed to into the hopper. A fluid-actuated cylinder 24 is utilized to open and close that door. The door 22 swings about a horizontal axle 26 disposed along a lower edge of the door and travels between a pair of guide projections 28 of the hopper body. A drop door 30 closes the bottom of the mixing chamber 18 and is latched by a piston rod 32.

During operation, raw materials and/or scrap materials are loaded into the mixing chamber from the hopper. The hopper door is closed, the ram is lowered, and the rotors are rotated until the proper temperature and mixing time have been achieved. Additional raw materials or scrap can be added as necessary. A problem can occur in the event that water enters the mixing chamber, e.g., if wet scrap is used. As the mix heats up, the water can suddenly turn become converted to steam. The resulting pressure increase may be great enough to force the ram 20 upwardly and overcome the pressure of cylinder 24 to push the hopper door 22 open, allowing molten material to blow out of the mixer in an uncontrolled manner. Serious harm to adjacent personnel and equipment can occur when such a blow-out occurs.

It would be desirable, therefore, to be able to eliminate dangerous blow-outs of that type.

SUMMARY OF THE INVENTION

The present invention involves a mixing apparatus in which materials are mixed and heated. The apparatus includes a mixing body forming therein a mixing chamber, and a feed hopper communicating with the mixing chamber for supplying thereto materials to be mixed. The hopper includes a door which is movable between open and closed positions. Means is provided for heating the mixing chamber, and a mixing mechanism is disposed within the mixing chamber for mixing the materials. A door locking mechanism is provided which comprises at least one locking element movable between an unlocking position enabling the door to be fully opened, and a locking position enabling the door to be only partially opened in response to a pressure build-up within the mixing chamber, for venting such pressure in a controlled manner.

Preferably, the feed hopper comprises a hopper body. The door is movably mounted to the hopper body to be openable in a direction of opening movement. The locking element comprises at least one pin disposed on either the hopper body or the door, and a slot disposed on the other of the hopper body and door. The pin is movable into the slot to define the locking position of the locking mechanism. The slot is elongated in the direction of opening movement to define a predetermined distance by which the door can be opened in response to a pressure build-up in the mixing chamber.

The pin is preferably disposed on the door, and the slot is preferably formed in a portion of the hopper body disposed adjacent the door.

A fluid-actuated mechanism is preferably provided for extending and retracting the pin. The apparatus further includes a fluid actuated door closing mechanism for opening and closing the door, and a mechanism which is responsive to the arrival of the door in a closed position for permitting the pin to be moved to the locking position.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 1 is a vertical sectional view taken through a conventional batch mixer;

FIG. 4 is a sectional view taken along the line 4—4 in FIG. 2, when the hopper door is in a fully closed position;

FIG. 5 is a view similar to FIG. 4 after the hopper door has been blown to a partially opened venting position according to the present invention;

DETAILED DESCRIPTION OF A PREFERRED EMBODIMENT OF THE INVENTION

Figure 2:
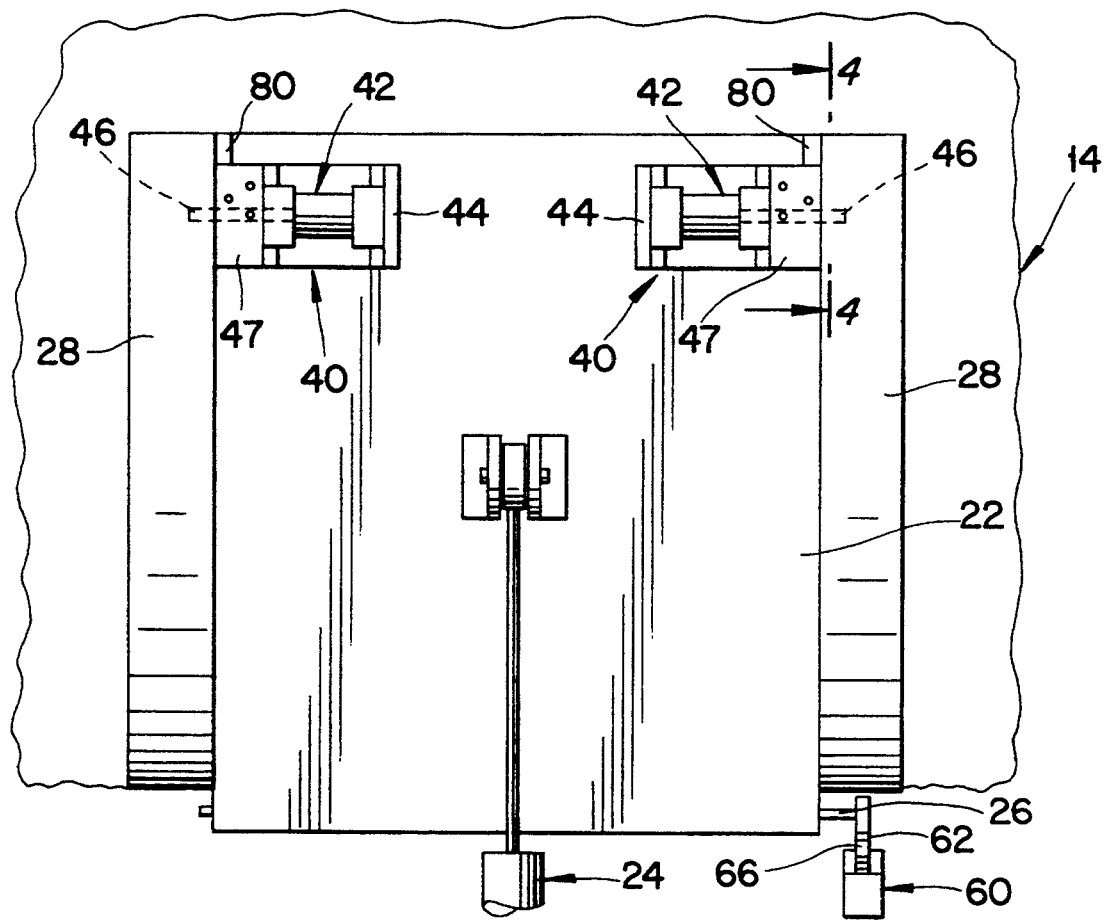
FIG. 2 is a front elevational view of a door of a feed hopper portion of the mixer, depicting a door-locking mechanism according to the present invention.
Figure 3:
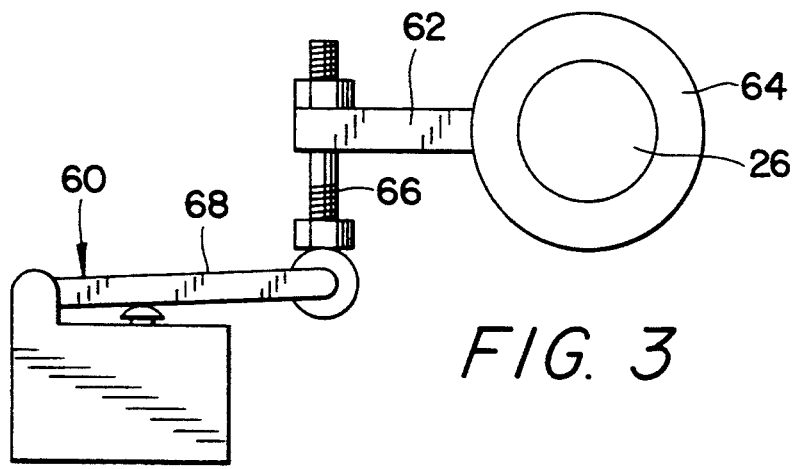
FIG. 3 is a side elevational view of an actuating valve for actuating the door locking mechanism according to the present invention.
Figure 6:
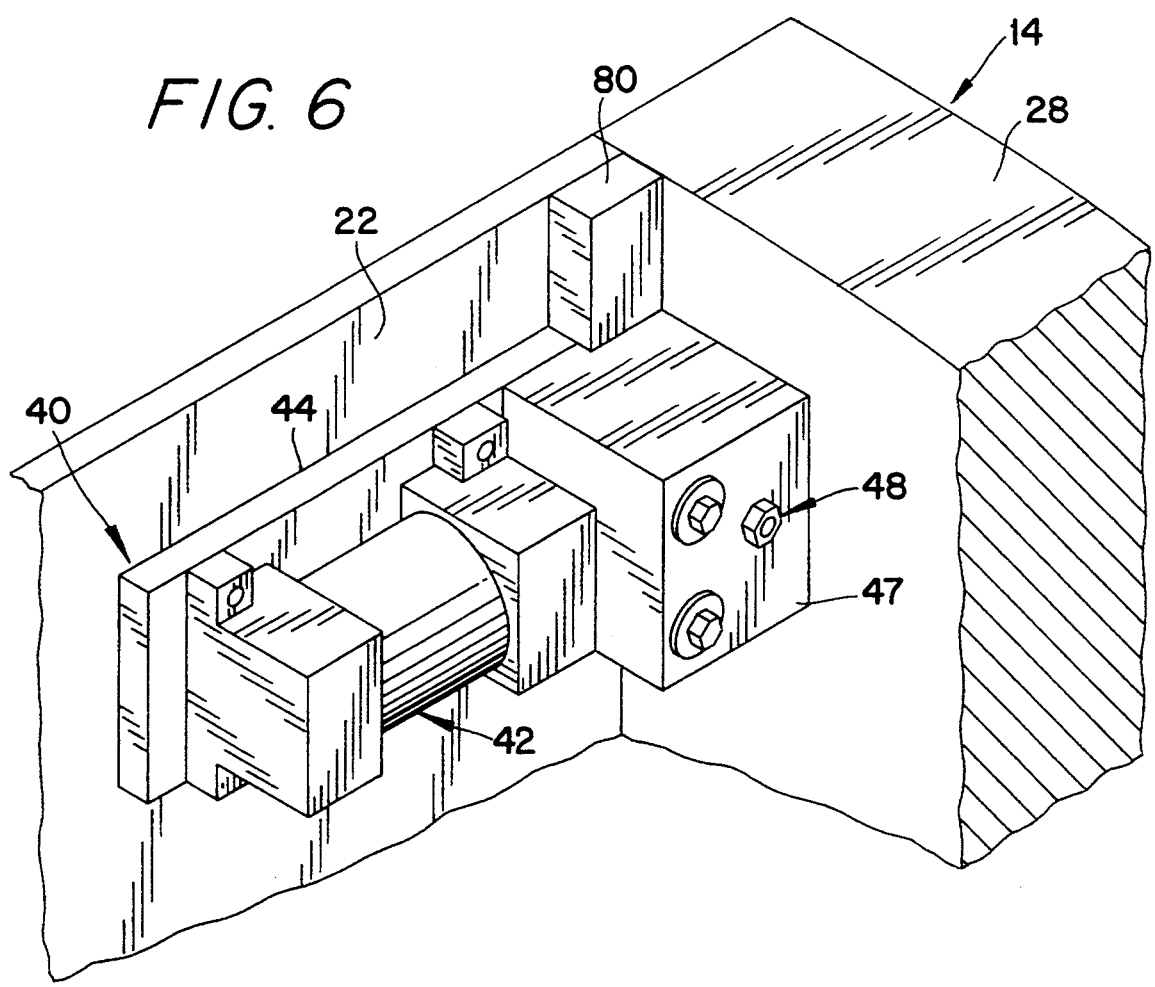
FIG. 6 is a perspective view of a portion of the hopper, depicting a locking cylinder according to the present invention.

A door locking mechanism for a batch mixer 10, such as a Banbury ™ mixer described earlier in connection with FIG. 1, is depicted in FIGS. 2-7. That mechanism comprises a pair of lock assemblies 40 mounted at respective upper corners of the hopper door 22. The lock assemblies 40 are identical, each comprising a fluid-actuated cylinder 42 mounted (e.g., bolted) to a base plate 44 which is affixed (e.g., welded) to the door 22. An extendible/retractable steel piston rod 46 (see FIG. 4) of the cylinder 41 passes through a bore of a pin block 47 affixed (e.g., bolted) to the door 22 and is aligned with a slot 48 formed in the respective guide projection 28 of the hopper body. The pin block 47 is equipped with a grease fitting 48 to enable lubricating grease to be injected into the bore of the pin block for facilitating reciprocable sliding movement of the piston rod 46, the latter defining a locking pin 46 as will be explained.

The slot 48 is elongated in a direction 51 (see FIG. 5) corresponding to a direction of movement of the door 22, and the pin 46 is arranged to enter a front portion of the slot when the door 22 has been closed by the door-closing cylinder 24, as shown in FIG. 4.

As explained earlier, during operation of the batch mixer 10, conditions can occur, e.g., the introduction of water into the mixing chamber, which might result in the sudden formation of steam which generates sufficient pressure to overcome the door-closing cylinder 22 and blow hot molten material from the mixer which represents a danger to adjacent personnel and equipment.

However, in accordance with the present invention in which at least one locking pin 46 is disposed in a slot 48 (there preferably being two locking pins 46 disposed in respective slots 48), the extent to which the door 22 can be blown open by a pressure build-up is controlled. A condition in which the door 22 has been controllably blown open is depicted in FIG. 5 (and in broken lines in FIG. 1) wherein the pin has abutted a rear end wall 50 of the slot to prevent further opening movement of the door. The slot 48 is only of such length as to permit venting of the internal pressure within the mixing chamber while preventing a dangerous amount of molten material to escape. For example, the slot length could be such as to permit the door to open by one-half to one inch.

The latching assemblies 40 are preferably operated automatically by the same fluid actuating system (see FIG. 7) which operates the door-closing cylinder 24, the system being designed, however, to ensure that the locking pins 46 do not close until the door 22 has been closed. This is effected by providing a valve 60 in the fluid circuit which, until opened, prevents the locking pins 46 from being extended. The valve 60 can comprise a conventional Schrader Bellows three-way valve which includes an upwardly biased valve arm 68 that can be actuated by an actuator finger 62 that rotates with the door 22. The finger 62 is mounted to a collar 64 which is affixed to the door axle 26. (If the axle 26 is not long enough, an extension can be attached thereto, and the finger 62 mounted on the extension.) The finger 62 carries an adjustable stud 66 which abuts and depresses the arm 68. By a proper adjustment of the stud 66, it can be ensured that the valve 60 is actuated only when the door 22 has reached a closed position.

Figure 7:
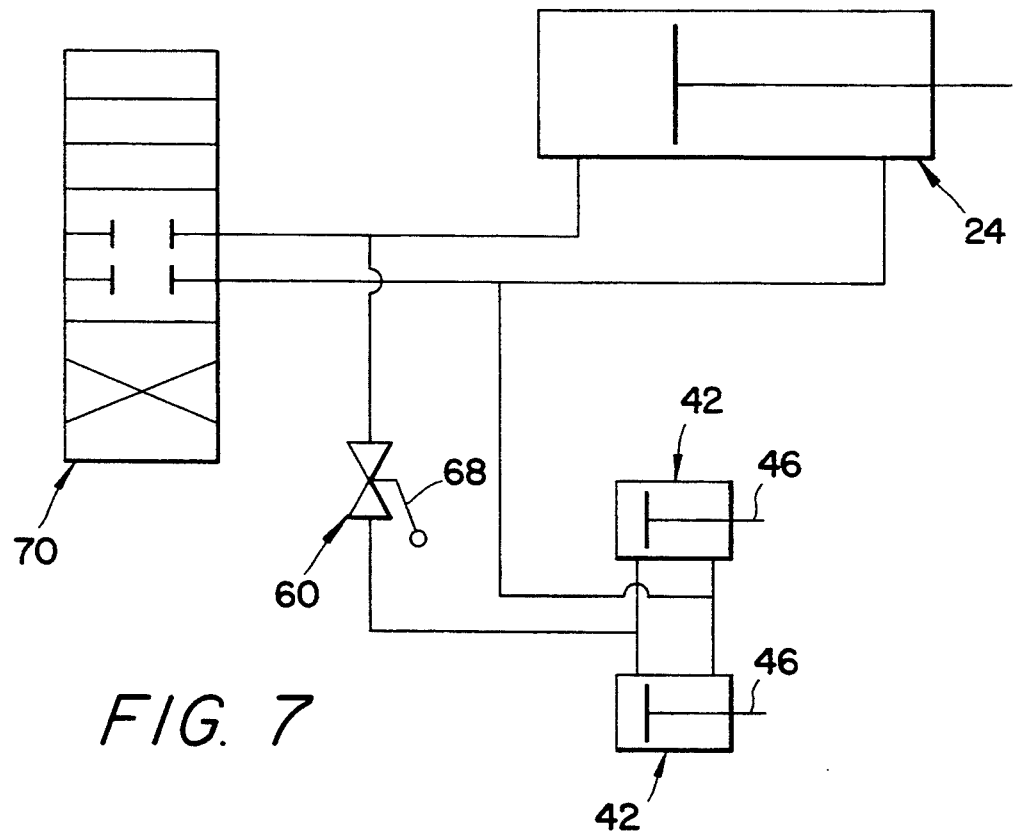
FIG. 7 is a schematic view of a fluid actuating system for controlling the door opening and locking mechanisms.

As depicted in FIG. 7, a control valve 70 is manually or electrically actuated to open and close the door 22 and to extend and retract the locking pins 46. The valve 60 is arranged to block the flow of air to the locking cylinders 42 until actuated by the finger 62 that rotates with the door axle 26. Preferably, the system is pneumatically activated by air pressure, although hydraulic pressure could be used if desired.

A conventional door wiper seal 80 is mounted to the edge of the door 22 above (or below) each pin block 47.

In operation of the mixer 10, polymeric materials are introduced into the mixing chamber 18 through the hopper 14, with the hopper door 22 in a fully opened condition (the locking pins 46 being in a retracted position). Thereafter, the ram 20 is lowered, and the control valve 70 is shifted to actuate the door-closing cylinder 24 to close the door 22. When the door 22 reaches a closed position, the stud 66 actuates the valve 60 to enable air pressure to extend the locking pins 46 into the slots 48 (see FIG. 4). The rotors 56 are then rotated to effect a mixing operation. During normal mixing operations, the force of cylinder 24 is sufficient to keep the door 22 closed. However, in the event of a high pressure build-up within the mixing chamber 18 sufficient to overcome the closing force of the cylinder 24 (e.g., due to the generation of steam pressure in the mixing chamber), the door 22 will be swung open only as far as the slots 48 permit (e.g., one to one-half inch) so that the pressure is vented in a controlled manner, and an excessive amount of molten material cannot escape.

To open the door 22, the control valve 70 is shifted to reverse the flow of actuating air in order to retract the locking pins 46 and swing the door open. If the locking pins 46 do not retract quickly enough to produce a sufficiently smooth opening of the door 22, a conventional snubber (flow control) valve (not shown) could be installed in the fluid system on the retract side of the hopper door cylinder, as will be appreciated by any artisan.

It will be appreciated that the present invention enables excessive internal pressure of a batch mixer to be safely vented in a controlled manner, thereby eliminating the possibility of harm occurring to adjacent personnel and equipment.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A mixing apparatus in which materials are mixed and heated, comprising:
   a mixing body forming therein a mixing chamber;
   a feed hopper communicating with said mixing chamber for supplying thereto materials to be mixed, said hopper including a door movable between open and closed positions;
   heating means for heating the materials in the mixing chamber;
   mixing means in said mixing chamber for mixing the materials; and
   door locking means comprising at least one locking element movable between an unlocking position enabling said door to be fully opened, and a locking position enabling said door to be only partially opened in response to a pressure build-up within said mixing chamber, for venting such pressure in a controlled manner.

2. The mixing apparatus according to claim 1, wherein said feed hopper comprises a hopper body, said door being movably mounted to said hopper body to be openable in a direction of opening movement, said locking element comprising at least one pin disposed on one of said hopper body and said door, and a slot disposed on the other of said hopper body and said door, said pin being movable into said slot to define said locking position of said locking means, said slot being elongated in said direction of opening movement to define a predetermined distance by which said door can be opened in response to a pressure build-up in said mixing chamber.

3. The mixing apparatus according to claim 2, wherein said pin is disposed on said door, and said slot is disposed on said hopper body.

4. The mixing apparatus according to claim 3, wherein there are two said pins disposed at respective corners of said door and insertable into respective slots.

5. The mixing apparatus according to claim 2, including fluid-actuated means for extending and retracting said pin, and further including fluid-actuated door closing means for opening and closing said door, and means responsive to the arrival of said door in a closed position for permitting said pin to be moved to said locking position.

6. The mixing apparatus according to claim 5, wherein said means for permitting movement of said pin comprises a valve arranged to control fluid flow to said pin, and actuating means for actuating said valve to admit fluid to said pin in response to said door reaching said closed position.

7. The mixing apparatus according to claim 6, wherein said door is hinged to swing about an axle, said actuating means being operably connected to said axle for rotation therewith and being operably engageable with said valve.

8. The mixing apparatus according to claim 7, wherein said actuating means is adjustable to vary the timing relationship between the closing of said door and the opening of said valve.

9. The mixing apparatus according to claim 1, wherein said mixing means comprises rotatable rotors, and further including a reciprocable ram for closing an upper end of said mixing chamber, a lower end of said mixing chamber being openable and closable by a drop door.

10. A batch mixer for mixing and heating polymeric materials, comprising:
    a mixing body forming therein a mixing chamber;
    a feed hopper communicating with said mixing chamber for supplying thereto materials to be mixed, said hopper including a hopper body and a door mounted on said hopper body, said door being swingable about an axle between open and closed positions, said axle located along a lowermost edge of said door;
    heating means for heating materials in said mixing chamber;
    mixing rotors disposed in said mixing chamber for mixing the materials;
    door-closing means for urging said door to a closed position; and
    door locking means comprising:
        a plurality of fluid-actuated pins mounted on said door adjacent an upper edge thereof, each pin arranged to be moved between a retracted position and an extended position in which said pin extends outwardly beyond an edge of said door,
        slot defining means disposed on said hopper body and defining slots arranged to receive respective ones of said pins when said pins are in their extended positions, said slots being elongated in a direction corresponding to a direction of movement of said door to enable said door to be only partially opened in response to a pressure build-up within said mixing chamber sufficient to overcome the urging of said closing means, thereby venting such pressure in a controlled manner.

11. The batch mixer according to claim 10, wherein said door-locking means further includes means responsive to the arrival of said door in said closed position for permitting said pins to be moved to said extended position.

* * * * *